United States Patent Office 3,560,546
Patented Feb. 2, 1971

3,560,546
PENTACOORDINATE ENDBLOCKED SILOXANES
Cecil L. Frye, Midland, Mich., assignor to
Dow Corning Corporation, Midland, Mich.
No Drawing. Filed Feb. 5, 1969, Ser. No. 796,903
Int. Cl. C07d 103/04; C07f 7/04
U.S. Cl. 260—448.8
14 Claims

ABSTRACT OF THE DISCLOSURE

Pentacoordinate endblocked siloxanes useful as curing agents for epoxy resins and as extreme pressure additives for lubricants are disclosed.

This invention relates to new pentacoordinate endblocked siloxanes.

More specifically, this invention relates to pentacoordinate endblocked siloxanes having the general formula

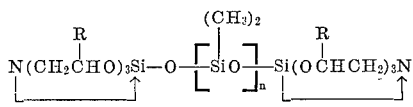

wherein R is selected from the group consisting of the hydrogen atom and hydrocarbon radicals containing from 1 to 6 carbon atoms, and $n$ is an integer.

As stated above, R can be a hydrogen atom or a hydrocarbon radical containing from 1 to 6 carbon atoms. Thus R can be, for example, an alkyl, alkenyl, cycloalkyl or an aryl radical. Specific illustrative examples of R include the methyl, ethyl, propyl, butyl, amyl, hexyl, vinyl, alkyl, cyclopentyl, cyclohexyl and phenyl radicals. It is preferred that R be a hydrogen atom or a methyl radical. It is further preferred that no more than one R of each endblocker be larger than a methyl radical. These latter compounds can be illustrated by the general formula

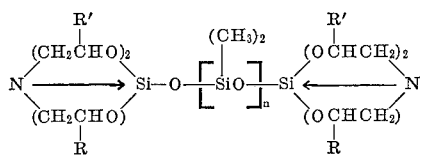

wherein R and $n$ are as defined heretofore and R' is a hydrogen atom or a methyl radical. When more than one larger group is present difficulty may be encountered in distilling the product from the reaction mixture without thermally decomposing it due to the high temperature that would be necessary.

As further stated above, $n$ is an integer. Thus, for example, $n$ can be 0, 1, 2, 3, 4, 5, 10, 25, 50, 100, 350, 500, 1000, 10,000 or larger. Preferably $n$ has a value of from 0 to 1000, with a value of from 0 to 5 being especially preferred.

The compounds of this invention are useful as curing agents for epoxy resins and also as extreme pressure additives for lubricating oils and greases. While the amount of the compound employed can vary widely and will depend on the specific situation, generally speaking the amount used will be in the range of 0.1 to 10% by weight.

There are at least two methods by which the compounds of this invention can be prepared. One method comprises heating a mixture of a trialkoxy endblocked siloxane and a trialkanolamine. It is preferable that the reaction be carried out in the presence of an alkali metal hydroxide catalyst, such as sodium hydroxide, potassium hydroxide, lithium hydroxide or cesium hydroxide, preferably potassium hydroxide, to facilitate an adequate reaction rate below the decomposition temperature. This preparation can be illustrated by the following equation wherein R'' is an alkyl radical (preferably containing from 1 to 3 carbon atoms) and R and $n$ are as defined above.

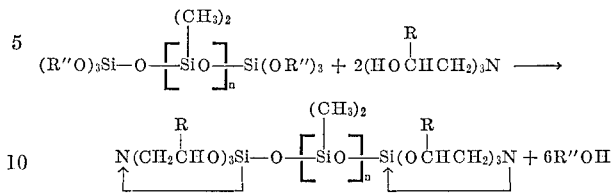

A second method of preparing the compounds of this invention comprises reacting a pentacoordinate silanol with either dimethyldichlorosilane or a chlorine endblocked dimethylsiloxane in a suitable solvent such as chloroform and in the presence of a suitable HCl acceptor such as triethylamine. This reaction is generally exothermic. This preparation can be illustrated by the following equation wherein R and $n$ are as defined above and $p$ is an integer greater than zero.

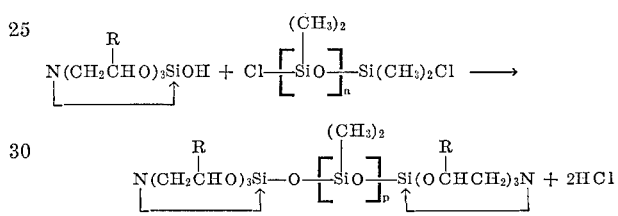

Now in order that those skilled in the art may better understand how the present invention can be practiced, the following examples are given by way of illustration and not by way of limitation. All parts and percents referred to herein are by weight unless otherwise specified.

EXAMPLE 1

Hexaethoxydisiloxane (68.4 g., 0.200 mole), triisopropanolamine (76.4 g., 0.400 mole) and potassium hydroxide (0.24 g.) were heated together under a short distillation column. The reaction flask was heated to 270° C. over a two hour period during which time 52.5 g. (95% of the theoretical amount) of ethanol was distilled from the system. Subsequent distillation of the residue yielded 52.8 g. (59% yield) of

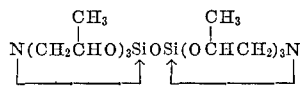

having a boiling point of 215° C. at 0.10 mm. of mercury pressure and a melting point from toluene of 185°–190° C. Analysis of the product showed it to contain 12.55% silicon and have a neutral equivalent of 229 as compared to theoretical values of 12.54% silicon and a neutral equivalent of 224. The infrared spectrum showed strong lines at 8.7, 8.9, 9.25, 10.2 and 11.3μ, and confirmed the absence of ethoxy groups (no absorption at 10.55μ). The absence of ethoxy groups was also confirmed by the nuclear magnetic resonance (NMR) spectrum with only those lines expected for the

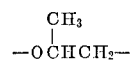

moiety being observed.

EXAMPLE 2

When the trialkanolamines set forth below are substituted for the triisopropanolamine of Example 1 in equivalent amounts the indicated products are obtained.

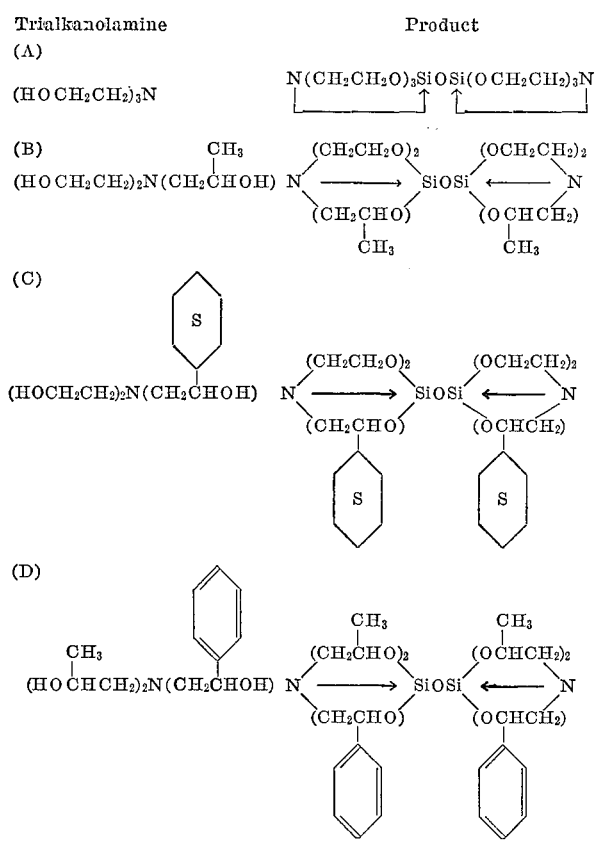

EXAMPLE 3

When the trialkoxy endblocked siloxanes set forth below are reacted with triisopropylamine in a mole ratio of 1 to 2 by heating them at about 250° to 300° C. for about two hours in the presence of potassium hydroxide, the indicated products are obtained.

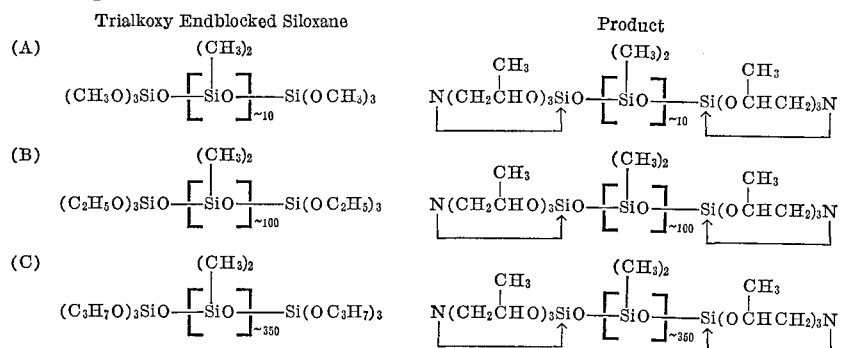

EXAMPLE 4

When sodium hydroxide, lithium hydroxide or cesium hydroxide is substituted for the potassium hydroxide of the preceding examples, the same products are obtained.

EXAMPLE 5

To a solution of 0.3 g. (0.068 mole) of

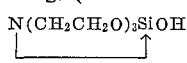

and 9 g. (0.089 mole) of triethylamine in 200 g. of chloroform in a 500 ml. suction flask there was slowly added 5 g. (0.039 mole) of dimethyldichlorosilane which resulted in an exotherm. The volatiles (chloroform) were vacuumed off and then hexane added, the solution heated and then filtered to remove the triethylamine hydrochloride. The product was heated again with hexane and then recrystallized from benzene to obtain a 44% (6.5 g.) yield of

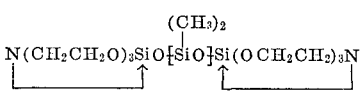

Elemental analysis showed the product to contain 16.95% silicon, 40.95% carbon and 7.07% hydrogen as compared to theoretical values of 19.2%, 38.3% and 6.91% respectively. The product had a neutral equivalent of 226 as compared to a theoretical value of 219, and it decomposed at 240° C.

EXAMPLE 6

The procedure of Example 5 was repeated except that 12.5 g. (0.0654 mole) of

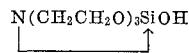

11 g. (0.109 mole) of triethylamine and 10 g. (0.0493 mole) of $Cl(CH_3)_2SiOSi(CH_3)_2Cl$ was used, and the product was heated twice with hexane and once with heptane. A 53% yield (8.9 g.) was obtained of

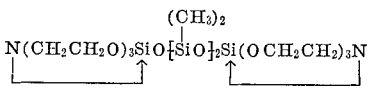

Elemental analysis showed the product to contain 21.45% silicon, 37.85% carbon and 7.25% hydrogen as compared to theoretical values of 21.9%, 37.5% and 7.09% respectively. The product had a neutral equivalent of 258 as compared to a theoretical value of 257, and it melted over a range of 191–194° C.

EXAMPLE 7

To a solution of 12 g. (0.064 mole) of

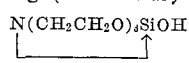

and 11 g. (0.109 mole) of triethylamine in 200 g. of ethanol free chloroform in a 500 ml. suction flask there was slowly added 13 g. (0.047 mole) of

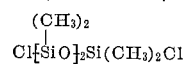

which resulted in an exotherm. The volatiles were vacuumed off, the reaction mixture transferred to a Soxhlet flask and heptane added. This mixture was allowed to stand overnight, then filtered, and upon cooling the product precipitated. It was evacuated to dryness. A 63% yield (11.9 g.) was obtained of

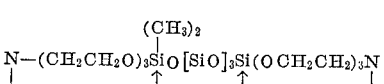

Elemental analysis showed the product to contain 23.6% silicon, 36.55% carbon and 7.09% hydrogen as compared to theoretical values of 23.9%, 36.8% and 7.23% respectively. The product had a neutral equivalent of 299 as compared to a theoretical value of 294, and it melted over a range of 139–140° C.

The ethanol free chloroform used herein was obtained by washing the chloroform twice with 5 ml. of concentrated sulfuric acid, then 3 to 4 times with water, then removing the water with calcium chloride, and finally distilling.

EXAMPLE 8

The procedure of Example 5 was repeated except that 12 g. (0.064 mole) of

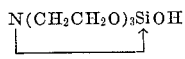

and 13 g. (0.037 mole) of

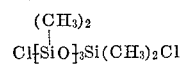

was used. A 35% yield (7.4 g.) was obtained of

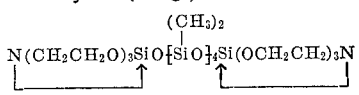

Elemental analysis showed the product to contain 24.55% silicon, 37.2% carbon and 7.52% hydrogen as compared to theoretical values of 25.5%, 36.3% and 7.33% respectively. The product had a neutral equivalent of 335 as compared to a theoretical value of 331, and it melted over a range of 121–122° C.

EXAMPLE 9

The procedure of Example 5 was repeated except that 12 g. (0.064 mole) of

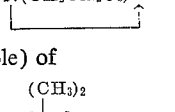

and 15 g. (0.035 mole) of

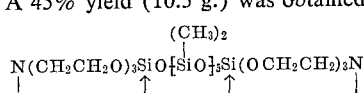

was used. A 45% yield (10.5 g.) was obtained of

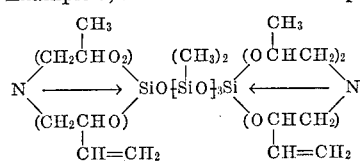

Elemental ananlysis showed the product to contain 25.9% silicon, 36.25% carbon and 7.60% hydrogen as compared to theoretical values of 26.7%, 35.9% and 7.42% respectively. The product had a neutral equivalent of 376 as compared to a theoretical value of 368, and it melted over a range of 67–68° C.

EXAMPLE 10

When the pentacoordinate silanols set forth below are substituted for the pentacoordinate silanol of Example 5 in equivalent amounts, the indicated products are obtained.

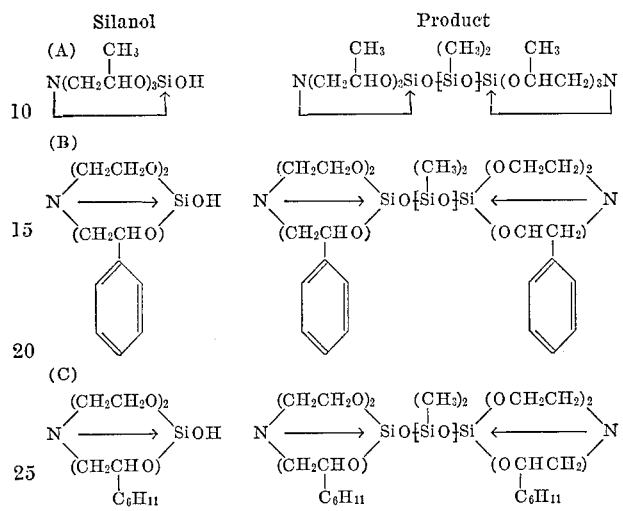

EXAMPLE 11

When the chlorine endblocked dimethylsiloxanes set forth below are substituted for the one set forth in Example 7 in equivalent amounts, the indicated products are obtained.

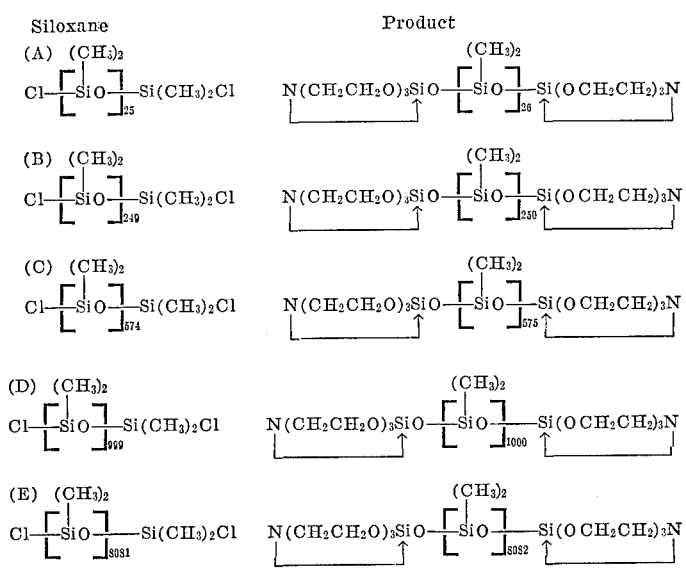

EXAMPLE 12 when is substituted in equivalent amounts for the silanol in the process of Example 7, there is obtained as the product

EXAMPLE 13

This example illustrates how the silanols used in preparing the compounds of this invention can be prepared.

To a 5-liter distillation flask there was added 2080 g. (10 moles) of $Si(OC_2H_5)_4$ and 1940 g. (13 moles) of triethanolamine. After refluxing for 18 hours, the system was gradually evacuated to a pressure of 10 mm. of mercury and a pot temperature of 90° C. In this manner 1337 g. (29 moles) of ethanol were collected. Upon heating the pot contents to a temperature of 180° C. and a pressure of 1 mm. of mercury, ethanol was evolved and the pot contents solidified.

A 79 g. sample of the above solid pot residue was then treated as follows. It was extracted with 200 g. of boiling chloroform and then again with 250 g. of boiling chloroform. The residue weighed 25 g. and melted nondescriptly over the range of 205–250° C. This solid was taken up in 50 g. of dichloromethane and then 100 g. of benzene was added; the solution was then boiled until enough dichloromethane was lost to cause deposition of a white solid melting at 260° C. with decomposition. Similar treatment of the two chloroform extracts produced additional quantities of this solid; a total of 29 g. of this solid was obtained from the original 79 g. portion.

Elemental analysis of this intermediate product $N[CH_2CH_2OSi(OCH_2CH_2)_3N]_3$ showed it to contain 42.86% carbon, 7.53% hydrogen, 12.56% silicon and 7.85% nitrogen as compared to theoretical values of 43.20% carbon, 7.23% hydrogen, 12.60% silicon and 8.38% nitrogen.

This crystalline solid is very easily soluble in chloroform. This surprising reversal of solubility is believed to be ascribable to the formation of a hydrate, the water presumably having been introduced by the dichloromethane which was not dried before use. Infrared examination showed two rather strong absorptions at 3 and 6 microns confirming the presence of water. Determination of active hydrogen (standard $LiAlH_4$ method) showed the presence of 0.622% water. Applying this correction to the above elemental analyses gives corrected values of 43.12% carbon, 12.65% silicon and 7.90% nitrogen.

A solution of 15 g. (0.0224 mole) of the above prepared hydrated product in 80 ml. of reagent grade chloroform was prepared. This 15 g. sample contains 0.093 g. (0.62%) of water. To this solution there was added 1.21 g. of water for a total of 1.30 g. (0.0722 mole); this water was not completely miscible with the chloroform solution. Upon standing overnight at room temperature, 6.6 g. (51% yield) of a crystalline deposit was collected which had a melting point of 205°–210° C. This deposit was

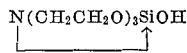

Elemental analysis of this product showed it to contain 37.58% carbon, 6.79% hydrogen, 14.45% silicon and 6.98% nitrogen and to have a neutral equivalent of 192.0 as compared to theoretical values of 37.68% carbon, 6.85% hydrogen, 14.68% silicon and 7.32% nitrogen and a neutral equivalent of 191.3. Infrared examination confirmed the presence of OH and the absence of water.

EXAMPLE 14

When 3 parts of the compound of Example 1 are added to 100 parts of a liquid epoxy resin it is an effective curing agent for the resin. When 5 parts of the compound of Example 1 are added to 100 parts of a solid epoxy resin it is an effective curing agent for the resin.

EXAMPLE 15

When the compounds of Examples 5–9 are added to hydrocarbon or silicon lubricating oils in amounts ranging from 0.5 to 2.5% the oils function better at extreme pressures. Similar results can be obtained by the use of the compound of Example 1 in hydrocarbon or silicon based greases.

That which is claimed is:

1. A pentacoordinate siloxane having the general formula

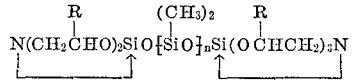

wherein R is selected from the group consisting of the hydrogen atom and hydrocarbon radicals containing from 1 to 6 carbon atoms, and n is an integer, each

having its O bonded to Si and the C of its $CH_2$ bonded to N.

2. A pentacoordinate siloxane as defined in claim 1 wherein n is zero.

3. A pentacoordinate siloxane as defined in claim 2 wherein R is selected from the group consisting of the hydrogen atom and the methyl radical.

4. A pentacoordinate siloxane as defined in claim 1 wherein n is from 1 to 1000.

5. A pentacoordinate siloxane as defined in claim 4 wherein n is from 1 to 5.

6. A pentacoordinate siloxane as defined in claim 5 wherein R is selected from the group consisting of the hydrogen atom and the methyl radical.

7. A pentacoordinate siloxane as defined in claim 1 which has the general formula

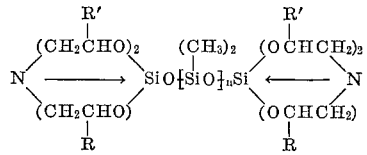

wherein R' is selected from the group consisting of the hydrogen atom and the methyl radical.

8. A pentacoordinate siloxane as defined in claim 7 wherein n is zero.

9. A pentacoordinate siloxane as defined in claim 7 wherein n is from 1 to 5.

10. A process for preparing a pentacoordinate siloxane having the general formula

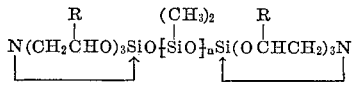

wherein R is selected from the group consisting of the hydrogen atom and hydrocarbon radicals containing from 1 to 6 carbon atoms, and n is an integer, each

having its O bonded to Si and the C of its $CH_2$ bonded to N, said process comprising heating a mixture of (1) a trialkoxy endblocked siloxane of the formula

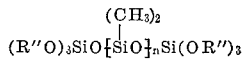

wherein R" is an alkyl radical and n is as defined above, and (2) a trialkanolamine of the formula

wherein R is as defined above, and recovering the pentacoordinate siloxane.

11. The process as defined in claim 10 wherein the reaction is carried out in the presence of an alkali metal hydroxide.

12. The process as defined in claim 11 wherein R is selected from the group consisting of the hydrogen atom and the methyl radical, n is zero, and the alkali metal hydroxide is potassium hydroxide.

13. A process for preparing a pentacoordinate siloxane having the general formula

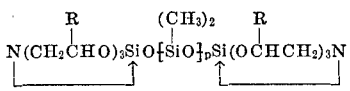

wherein R is selected from the group consisting of the hydrogen atom and hydrocarbon radicals containing from 1 to 6 carbon atoms, and $p$ is an integer greater then zero, each

having its O bonded to Si and the C of its $CH_2$ bonded to N, said process comprising reacting (1) a pentacoordinate silanol of the formula

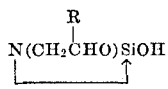

wherein R is as defined above, and (2) a chlorine endblocked siloxane of the formula

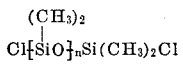

wherein $n$ is an integer including zero, in a solvent and in the presence of an HCl acceptor.

14. The process as defined in claim 13 wherein R is selected from the group consisting of the hydrogen atom and the methyl radical, $p$ has a value of from 1 to 5, $n$ has a value of from 0 to 4, the solvent is chloroform, and the HCl acceptor is triethylamine.

References Cited

UNITED STATES PATENTS

| | | | |
|---|---|---|---|
| 3,355,477 | 11/1967 | Frye | 260—448.8 |
| 3,360,525 | 12/1967 | Frye | 260—448.8X |
| 3,455,980 | 7/1969 | Frye | 260—448.8 |
| 2,953,545 | 9/1960 | Finestone | 260—448.8X |
| 3,118,921 | 1/1964 | Samour | 260—448.8 |

TOBIAS E. LEVOW, Primary Examiner

P. F. SHAVER, Assistant Examiner

U.S. Cl. X.R.

260—46.5, 2, 830; 252—49.6